Patented Aug. 10, 1954

2,686,202

UNITED STATES PATENT OFFICE 2,686,202

PRODUCTION OF AROMATIC SULFONYL FLUORIDES

George McCoy, Philadelphia, Charles E. Inman, Roslyn, and Paul G. Haines, Lafayette Hill, Pa., assignors to The Pennsylvania Salt Manufacturing Company, Philadelphia, Pa., a corporation of Pennsylvania No Drawing. Application March 19, 1951, Serial No. 216,464

12 Claims. (Cl. 260—543)

This invention relates to a process for production of aromatic sulfonyl fluorides employing fluosulfonic acid, and particularly to the method of isolating the sulfonyl fluoride from a mixture of it with fluosulfonic acid.

Aromatic sulfonyl fluorides are made by various methods, for example, by reacting the corresponding aryl sulfonyl chloride with aqueous sodium or potassium fluoride solutions or with other fluorinating agents capable of replacing chlorine by fluorine, or, using fluosulfonic acid as a reagent in the synthesis, by reacting this acid with the corresponding parent aromatic compound, or the corresponding sulfonic acid or the corresponding sulfonyl chloride. The fluosulfonic acid reagent obviously gives greater latitude in the selection of the aromatic reactant but has the disadvantage that the sulfonyl fluoride product must be isolated from a reaction mixture which contains the excess fluosulfonic acid which is usually employed, and the high reactivity of this substance places limitations on the handling of the mixture.

When aromatic sulfonyl fluorides have been made using fluosulfonic acid as the reagent, prior to our invention, the isolation of the sulfonyl fluoride product has involved the wasteful procedure of diluting the reaction mixture with water, thus making the fluosulfonic acid (and the HF which is also present) unrecoverable.

We have now found that despite the high reactivity of fluosulfonic acid, certain organic solvents may be used to extract aromatic sulfonyl fluorides from mixtures thereof with fluosulfonic acid, for example, the mixtures that are obtained when aromatic sulfonyl fluorides are made by a reaction involving fluosulfonic acid as a reagent. We have further found that the yield of aromatic sulfonyl fluoride may be unexpectedly higher when isolated by this extraction method, as compared to the prior method of dilution with water.

The solvents useful in our invention in general fall within the definition of saturated aliphatic (including cycloaliphatic) hydrocarbons and halohydrocarbons boiling within the range 30 to 200° C., preferably within the range 40 to 150° C., and which are immiscible with fluosulfonic acids. Examples of such solvents include anhydrous carbon tetrachloride, petroleum ether, ethylene chloride, methylene chloride, tetrachloroethane, pentachloroethane, cyclohexane, chloroform, methylcyclohexane, heptane, n-amyl fluoride, ethylene bromide, sym. tetrabromoethane, and combinations of these solvents. The amount of the solvent may range from about 2 to 20 parts by volume solvent per part by volume of mixture.

In the practice of our invention, an aromatic compound or its corresponding sulfonic acid or sulfonyl chloride is reacted with an excess of fluosulfonic acid beyond that needed for production of the desired sulfonyl fluoride. Preferably, the excess is of the order of 3 to 5 mols fluosulfonic acid per mol aromatic compound. The reaction can generally be brought about simply by stirring the reactants together at room temperature and permitting them to stand until no further reaction occurs, but may also be carried out by maintaining temperatures between about −5° C. and 160° C. instead of only room temperature. The reaction mixture generally contains fluosulfonic acid, HF, sulfuric acid and aromatic sulfonic acids in addition to the aromatic sulfonyl fluoride product.

The isolation of the sulfonyl fluoride product is then accomplished by extraction with the organic solvent. Preferably, the extraction is carried out by passing the two liquids countercurrent to each other in a column, with take-off of the organic solvent solution either at the top or the bottom depending on its specific gravtiy with relation to the acid reaction mixture. The organic solvent solution of the sulfonyl fluoride product may then be neutralized e. g. with soda ash or other mild alkali and is then preferably distilled at reduced pressure taking off both the solvent and the sulfonyl fluoride product as separate distillates. There is generally a distillation residue consisting of sulfones and tars.

The excess fluosulfonic acid may be recovered from the spent acid reaction by distillation, preferably at reduced pressure and preferably after addition of sulfur trioxide (dissolved in fluosulfonic acid for ease of handling) to convert dissolved HF into fluosulfonic acid.

The following examples are illustrative of the process of the invention:

EXAMPLE 1

Four moles of fluosulfonic acid and one mole of benzene sulfonic acid were mixed and permitted to stand overnight at room temperature. The mixture was then extracted, in countercurrent flow in a column, with anhydrous carbon tetrachloride in the amount of about 3 parts by volume of carbon tetrachloride for each part of reaction mixture and extracting for about 4 to 6 hours in an apparatus providing for continual distillation and recycling of solvent at a rate of about 3 parts by volume of carbon tetrachloride per hour per each part of reaction mixture. After separating, washing with aqueous sodium carbonate solution, then with water and drying, the carbon tetrachloride solution was distilled to give an 87.7% yield of benzenesulfonyl fluoride. In another case when extraction was begun immediately after mixing about the same yield of product was obtained.

EXAMPLE 2

To 5 moles of fluosulfonic acid in a copper flask was added 1 mole of chlorobenzene during 5 hours while stirring and maintaining the temperature at 20–30° C. After standing overnight the reaction mixture was extracted with anhydrous carbon tetrachloride in essentially the same manner as in Example 1. After separating, washing, and drying, the carbon tetrachloride solution was distilled to give a 72% yield of chlorobenzenesulfonyl fluoride. Isolation from a similar reaction by dilution with water instead of by extraction gave a 41% yield.

EXAMPLE 3

To 4 moles of fluosulfonic acid was added 1 mole of naphthalene during 4.5 hours at 20–30° C. After standing overnight the reaction was extracted with anhydrous carbon tetrachloride in essentially the same manner as in Example 1. After separating, washing and drying, the carbon tetrachloride solution was distilled to give a 46% yield of naphthalenesulfonyl fluoride.

EXAMPLE 4

To 4 moles of fluosulfonic acid was added 1 mole o-chlorophenol during 5 hours while stirring and maintaining the temperature at 20–30° C. After standing overnight the reaction mixture was extracted with anhydrous carbon tetrachloride in essentially the same manner as in Example 1. After separating, washing and drying, the carbon tetrachloride solution was distilled to give a 49% yield of o-chlorophenolsulfonyl fluoride. Isolation from a similar reaction by dilution with water instead of by extraction gave a 33.5% yield.

EXAMPLE 5

To 2.5 moles of fluosulfonic acid was added 0.5 mole of dodecyltoluene during 4.5 hours at 20–30° C. After standing overnight the reaction mixture was extracted with anhydrous petroleum ether in essentially the same manner as in Example 1. After separating, washing, and drying, the petroleum ether solution was distilled to give a 58.6% yield of dodecyltoluenesulfonyl fluoride. Isolation from a similar reaction by dilution with water instead of by solvent extraction gave a 48% yield.

In the following table are additional examples of aromatic sulfonyl fluorides which may be prepared from the aromatic compound named (unless another reactant is indicated) employing an excess of fluosulfonic acid as the reagent. The procedure for carrying out the reaction and isolating product by solvent extraction in each case would be essentially as described in the above examples.

Aromatic sulfonyl fluoride product

The sulfonyl fluoride of p-chlorophenol
The sulfonyl fluoride of toluene
The disulfonyl fluoride of diphenyl
The sulfonyl fluoride of p-cymene
The sulfonyl fluoride of anisole
The sulfonyl fluoride of laurylbenzene
The sulfonyl fluoride of 2,4-dichlorophenol
The sulfonyl fluoride of p-tertiary amylphenol
The sulfonyl fluoride of 1,2,4-trichlorobenzene
The sulfonyl fluoride of diethylbenzene
The sulfonyl fluoride of p-chloroanisole
The sulfonyl fluoride of o-chlorophenetole
The sulfonyl fluoride of m-chlorophenol
The sulfonyl fluoride of o-dichlorobenzene
The sulfonyl fluoride of p-dichlorobenzene
The sulfonyl fluoride of ethylbenzene
The sulfonyl fluoride of tetralin.
The sulfonyl fluoride of tert.-butylbenzene.
The sulfonyl fluoride of o, m, and p-xylene.
The sulfonyl fluoride of diphenylether.
1,3-benzenedisulfonyl fluoride (from 1,3-benzenedisulfonyl chloride)
4-chlorobenzene-1,3-disulfonyl fluoride (from 4-chlorobenzene-1,3-disulfonyl chloride)
4-methylbenzene1,3-disulfonyl fluoride (from 4-methylbenzene-1,3-disulfonyl chloride)
4,6-dimethylbenzene - 1,3 - disulfonyl fluoride (from 4,6 - dimethylbenzene - 1,3 - disulfonyl chloride)
1,5 - naphthalenedisulfonyl fluoride (from 1,5-naphthalenedisulfonyl chloride)
1,3,5-benzenetrisulfonyl fluoride (from 1,3,5-benzenetrisulfonyl chloride)

A number of the above named sulfonyl fluorides are new compositions of matter, the subject of copending applications by one or more of the present applicants.

In each of the above examples including those shown in tabular form, any of the solvents as heretofore enumerated and defined may be used in the extraction, and the procedure is essentially as described in the working examples. As may be seen from the range of products above listed, the process of the invention is generally applicable to the production of aromatic sulfonyl fluorides, particularly the aromatic sulfonyl fluorides which are free of amino and alcoholic hydroxy substituents (herein referred to as $HSO_2F$-stable aromatic sulfonyl fluorides, or as sulfonyl fluorides inert to fluosulfonic acid); for example, the aromatic residue may contain one or more of the following structures separately or in combination: aliphatic or aromatic hydrocarbon groups, halogens, phenolic hydroxy groups, carboxy and other acid functioning groups, esters, nitro groups, aliphatic or aromatic ether or thioether linkages, aldehyde and ketone groups. The chemical structure of the preferred products for production in accordance with our invention is free of amino, alcohol, ether, thio-ether, aldehyde and ketone structures. The sulfonyl fluoride products made by our process may contain one or more —$SO_2F$ groups as substituents and the term "sulfonyl fluoride" used in the claims includes polysulfonyl fluorides. Our preferred products contain the $SO_2F$ group or groups as nuclear substituents.

Solvent extraction, in some instances, has been found unexpectedly to improve the yield of aryl sulfonyl fluoride. The reaction of the aromatic compound with fluosulfonic acid may possibly involve an equilibrium between the products and the reactants and the solvent extraction may effect this equilibrium in certain instances in such a way as to affect the yield of product. The following table shows the unexpectedly higher yield obtained in a number of instances in the solvent extraction process of the invention:

| Product | Yield by Extraction | Yield without Extraction |
| --- | --- | --- |
| | Percent | Percent |
| The sulfonyl fluoride of benzene | 87.7 | 60 |
| The sulfonyl fluoride of chlorobenzene | 72.0 | 41 |
| The sulfonyl fluoride of o-chlorophenol | 49.0 | 35.5 |
| The sulfonyl fluoride of dodecyltoluene | 58.6 | 48.0 |
| The sulfonyl fluoride of p-chlorophenol | 91.0 | 85.0 |

The above listed aryl sulfonyl fluorides are preferred sulfonyl fluoride products for production by the process of our invention.

Since many modifications may be made in the process as above described within the scope of the invention, the above description should be taken as illustrative only and the invention is not to be limited thereby.

We claim:

1. The method of separating an aromatic sulfonyl fluoride from a mixture that contains this material and fluosulfonic acid, comprising subjecting the mixture to extraction with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the aromatic sulfonyl fluoride from the fluosulfonic acid.

2. The method of separating an aromatic sulfonyl fluoride from a mixture that contains this material and fluosulfonic acid, comprising bringing the mixture, in dispersed form, in contact with 2 to 20 parts by volume, per part mixture, of a solvent selected from the group consisting of saturated aliphatic hydrocarbons, halohydrocarbons and mixtures thereof boiling within the range of 30 to 200° C. and which is immiscible with fluosulfonic acid, and separating the solvent containing the aromatic sulfonyl fluoride from the fluosulfonic acid.

3. In the process of production of an $HSO_3F$-stable aromatic sulfonyl fluoride by reacting fluosulfonic acid, employed in excess, with an aromatic compound, the step of isolating the aromatic sulfonyl fluoride product of reaction from the reaction mixture by extracting the mixture with 2 to 20 parts by volume, per part mixture, of a solvent selected from the group consisting of saturated aliphatic hydrocarbons, halohydrocarbons and mixtures thereof boiling within the range of 40 to 150° C. and which is immiscible with fluosulfonic acid, and separating the solvent containing the aromatic sulfonyl fluoride from the fluosulfonic acid.

4. The method of separating an $HSO_3F$-stable aromatic sulfonyl fluoride from a mixture that contains this material and fluosulfonic acid, comprising subjecting the mixture to extraction with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the aromatic sulfonyl fluoride from the fluosulfonic acid.

5. The method of separating an aromatic sulfonyl fluoride free of amine, ether, thio-ether, and aliphatic oxy and oxo structures from a mixture that contains this material and fluosulfonic acid, comprising bringing the mixture, in dispersed form, in contact with 2 to 20 parts by volume, per part mixture, of a solvent selected from the group consisting of saturated aliphatic hydrocarbons, halohydrocarbons and mixtures thereof boiling within the range of 30 to 200° C.

6. In the process of production of an aromatic sulfonyl fluoride by reacting fluosulfonic acid, employed in excess, with an aromatic compound, free of amine, ether, thio-ether, aliphatic oxy and oxo structures, the step of isolating the aromatic sulfonyl fluoride product of reaction from the reaction mixture by extracting the mixture with 2 to 20 parts by volume, per part mixture, of a solvent selected from the group consisting of saturated aliphatic hydrocarbons, halohydrocarbons and mixtures thereof boiling within the range of 40 to 150° C. and which is immiscible with fluosulfonic acid, and separating the solvent containing the aromatic sulfonyl fluoride from the fluosulfonic acid.

7. In the process of production of benzenesulfonyl fluoride employing fluosulfonic acid in the excess as reagent the step of isolating the benzenesulfonyl fluoride product of reaction from the reaction mixture that involves extracting the mixture with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the benzene sulfonyl fluoride from the fluosulfonic acid.

8. In the process of production of chlorobenzenesulfonyl fluoride employing fluosulfonic acid in excess as reagent, the step of isolating the chlorobenzenesulfonyl fluoride product of reaction from the reaction mixture that involves extracting the mixture with a solvent selected from the group consisting of saturated aliphatic hydrocarbons, halohydrocarbons and mixtures thereof boiling within the range of 30 to 200 °C. and which is immiscible with fluosulfonic acid, and separating the solvent containing the chlorobenzenesulfonyl fluoride from the fluosulfonic acid.

9. In the process of production of chlorophenolsulfonyl fluoride employing fluosulfonic acid in excess as reagent the step of isolating the chlorophenolsulfonyl fluoride product of reaction from the reaction mixture that involves extracting the mixture with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the chlorophenolsulfonyl fluoride from the fluosulfonic acid.

10. In the process of production of the sulfonyl fluoride of parachlorophenol employing fluosulfonic acid in excess as reagent the step of isolating the sulfonyl fluoride of parachlorophenol product of reaction from the reaction mixture that involves extracting the mixture with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the sulfonyl fluoride of parachlorophenol from the fluosulfonic acid.

11. In the process of production of the sulfonyl fluoride of orthochlorophenol employing fluosulfonic acid in excess as reagent the step of isolating the sulfonyl fluoride of orthochlorophenol product of reaction from the reaction mixture that involves extracting the mixture with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the sulfonyl fluoride of orthochlorophenol from the fluosulfonic acid.

12. In the process of production of dodecyltoluenesulfonyl fluoride employing fluosulfonic acid in excess as reagent the step of isolating the dodecyltoluenesulfonyl fluoride product of reaction from the reaction mixture that involves extracting the mixture with a solvent selected from the group consisting of saturated aliphatic hydrocarbons, halohydrocarbons and mixtures thereof boiling within the range of 30 to 200° C. and which is immiscible with fluosulfonic acid, and separating the solvent containing the dodecyltoluenesulfonyl fluoride from the fluosulfonic acid.

References Cited in the file of this patent

UNITED STATES PATENTS

| Number | Name | Date |
|---|---|---|
| 2,214,379 | Moser et al. | Sept. 10, 1940 |
| 2,276,097 | Salzberg | Mar. 10, 1942 |
| 2,337,532 | Thomas | Dec. 21, 1943 |

OTHER REFERENCES

Steinkopf, Journal Prakt, Chem., vol. 117, pp. 1–20 (1927).

Kulka, J. Am. Chem. Soc., vol. 72, pp. 1215–18 (1950).